US007643236B2

(12) United States Patent
Ohkawara

(10) Patent No.: US 7,643,236 B2
(45) Date of Patent: Jan. 5, 2010

(54) CENTRIFUGAL MACHINE

(75) Inventor: Tadashi Ohkawara, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 335 days.

(21) Appl. No.: 11/848,400

(22) Filed: Aug. 31, 2007

(65) Prior Publication Data

US 2008/0174909 A1 Jul. 24, 2008

(30) Foreign Application Priority Data

Sep. 5, 2006 (JP) .......................... P2006-239920

(51) Int. Cl.
*G11B 5/02* (2006.01)

(52) U.S. Cl. ........................................................ 360/55

(58) Field of Classification Search .................. 360/55, 360/69, 75, 97.02, 137, 73.03

See application file for complete search history.

(56) References Cited

U.S. PATENT DOCUMENTS 3,090,544 A * 5/1963 Woollenweber, Jr. et al. . 415/26
3,347,453 A 10/1967 Goergen
3,603,742 A * 9/1971 Schuller ...................... 360/55
3,975,195 A * 8/1976 Goffe .......................... 430/17
4,037,259 A * 7/1977 Hammon et al. .............. 360/66
4,772,259 A * 9/1988 Frech et al. .................... 604/23
5,228,626 A * 7/1993 Mayolo ....................... 241/65
5,309,301 A * 5/1994 Gregory et al. ............. 360/137
5,590,192 A * 12/1996 Lovett et al. .................. 705/51
6,128,151 A * 10/2000 Ma et al. ................. 360/73.03
6,674,598 B2 * 1/2004 Smith .......................... 360/69
6,760,175 B2 * 7/2004 Smith .......................... 360/69
6,829,117 B2 * 12/2004 Taki et al. ...................... 360/69
6,934,118 B2 * 8/2005 Hidaka et al. ............ 360/97.02
7,046,470 B2 * 5/2006 Yamanashi et al. ............ 360/69
7,119,978 B2 * 10/2006 Victor et al. .................. 360/69
2004/0125488 A1 * 7/2004 Zhu et al. ...................... 360/75
2004/0261567 A1 * 12/2004 Menaldo et al. ............... 74/522
2007/0129707 A1 * 6/2007 Blott et al. .................. 604/543
2009/0053814 A1 * 2/2009 Patel et al. ..................... 436/8
2009/0142198 A1 * 6/2009 Votaw et al. .................. 417/53
2009/0145576 A1 * 6/2009 Wyrick et al. ............. 165/11.1

FOREIGN PATENT DOCUMENTS

EP 0431645 A2 6/1991
JP 3-181347 8/1991
JP 3181347 8/1991

* cited by examiner

*Primary Examiner*—Fred Tzeng
(74) *Attorney, Agent, or Firm*—Brundidge & Stanger, P.C.

(57) ABSTRACT

A centrifugal machine comprises a rotor drivable and rotatable by a motor while holding a specimen, and including a recording medium for recording data therein; a Peltier element, when a voltage is applied thereto, for controlling the temperature of the rotor; a recording head disposed at a position adjacent to the rotor for reproducing data from the recording medium or for recording data into the recording medium; and, a control device not only for controlling the operation of the Peltier element when the Peltier element controls the temperature of the rotor but also for controlling the operation of the recording head when the recording head reproduces the data from the recording medium or records the data into the recording medium, wherein the control device, when carrying out the data reproduction or data recording with respect to the recording medium provided in the rotor, controls the Peltier element in such a manner that the operation of the Peltier element is caused to stop.

4 Claims, 4 Drawing Sheets

CENTRIFUGAL MACHINE

CROSS-REFERENCE TO RELATED APPLICATIONS

This application is based upon and claims the benefit of priority from Japanese Patent Application No. 2006-239920, filed Sep. 5, 2006, the entire contents of which are incorporated herein by reference.

BACKGROUND OF THE INVENTION

One embodiment of the invention relates to a centrifugal machine capable of managing the operation records of a rotor and, specifically, the invention relates to a centrifugal machine which can hold the operation record data of the rotor such as the number of rotations of the rotor and the total operation hours of the rotor.

A rotor (a rotating member), which is provided in a centrifugal machine for storing a specimen such as a cell and a gene, requires a high centrifugal acceleration and, therefore, it is necessary to rotate the rotor at a high speed, for example, at a speed of 100,000 $min^{-1}$ (rpm). This increases a centrifugal stress which acts on the rotor and, therefore, when the rotor is used repeatedly, there is a fear that a fatigue failure can occur in a rotor material made of a titanium alloy, duralumin or the like. Thus, the rotor is treated as a part the life of which is limited and, specifically, the number of integrating operation rotations or integrating operation time of the rotor is regulated (for example, 5000 rotations or 10,000 hours). When the number of operation rotations or operation time of the rotor reaches a prescribed number, the rotor is considered to have reached its fatigue limit; and thus, at the then time, the use of the rotor is to be stopped, and the rotor is to be disposed. As described above, the rotor has a limited life and, in order to operate the rotor safely, it is necessary to manage the operation record of the rotor.

As a conventional method for managing the operation record of a rotor, as disclosed in the Japanese Patent Publication Hei-3-181347, there is proposed a method in which, in a rotor, there is provided a magnetic recording medium having a magnetic film, data are recorded and reproduced by a magnetic head, and the operation record management of the rotor is recorded in the rotor.

On the other hand, a specimen to be stored in the rotor of a centrifugal machine, in some cases, is required that it is held at a low temperature (for example, 4° C.) in order to keep it fresh. As an example of a method for controlling the temperature of a rotor, there is well known a method in which the temperature of a rotor is measured using a temperature sensor and a voltage to be applied to a Peltier element provided in a rotor chamber is controlled to thereby control the temperature of the specimen.

In the above-mentioned conventional centrifugal machine, a recording head is made to approach a rotor having a magnetic recording medium (a disk memory) for recording the operation record data of the rotor, whereby data on the rotor operation record are recorded into the magnetic recording medium, or the data are reproduced from the magnetic recording medium. Specifically, the present inventors have checked this conventional centrifugal machine for the mounting of the above-mentioned Peltier element for adjusting the temperature of the rotor chamber and have found the following problems.

That is, when, in the periphery of the rotor, the magnetic head and Peltier element are disposed adjacent to each other and a supply voltage for driving the Peltier element is controlled on/off, noise generated from the Peltier element is introduced into the input/output circuit of the magnetic head and, in reproducing the operation record data, a control device (a microcomputer) mistakes the thus introduced noise for the record data, resulting in the misreading of the data. Also, in recording the operation record data as well, the control device records the noise introduced to the magnetic head circuit by mistake.

To solve the above problems, there can be expected a method in which there is employed a shielding wire in order to prevent the noise from being introduced to the magnetic head circuit and a ferrite core is added to the magnetic head circuit to thereby absorb the noise. However, in this method, additional provision of electric parts increases the cost of the composing parts that are associated with the control device.

SUMMARY OF THE INVENTION

One of objects of the present invention is to provide a centrifugal machine which can manage the life of a rotor and can control the temperature of a rotor chamber, characterized by a recording head and a recording medium which can accurately reproduce or record the rotor operation record data.

Another of objects of the present invention is to provide a centrifugal machine which can manage the life of a rotor and can control the temperature of a rotor chamber, characterized in that it can be manufactured at a relatively low cost.

According to an aspect of the present invention there is provided a centrifugal machine comprising: a rotor drivable and rotatable by a motor while holding a specimen, and including a recording medium for recording data therein; a Peltier element, when a voltage is applied thereto, for controlling the temperature of the rotor; a recording head disposed at a position adjacent to the rotor for reproducing data from the recording medium or for recording data into the recording medium; and, a control device not only for controlling the operation of the Peltier element when the Peltier element controls the temperature of the rotor but also for controlling the operation of the recording head when the recording head reproduces the data from the recording medium or records the data into the recording medium, wherein the control device, when carrying out the data reproduction or data recording with respect to the recording medium provided in the rotor, controls the Peltier element in such a manner that the operation of the Peltier element is caused to stop.

BRIEF DESCRIPTION OF THE DRAWINGS

The present invention may be more readily described with reference to the accompanying drawings.

DETAILED DESCRIPTION OF THE PREFERRED EMBODIMENTS

Now, description will be given below of a centrifugal machine according to an embodiment of the invention with reference to the accompanying drawings. In all figures used to explain the present embodiment, parts having the same functions are given the same designations and the repeated description thereof will be omitted.

Figure 1:
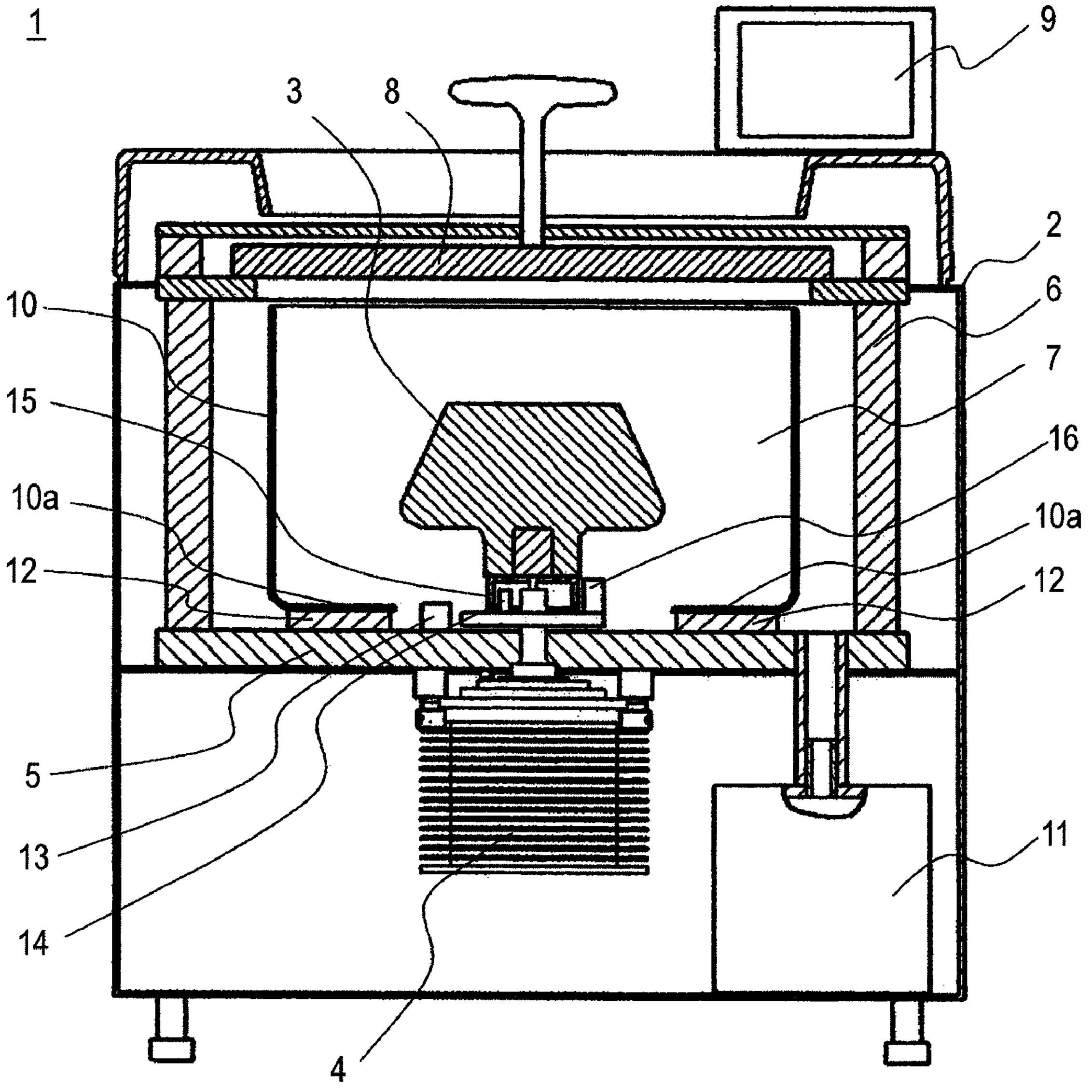
FIG. 1 is a structure view of the whole structure of a centrifugal machine according to an embodiment of the invention.
Figure 2:
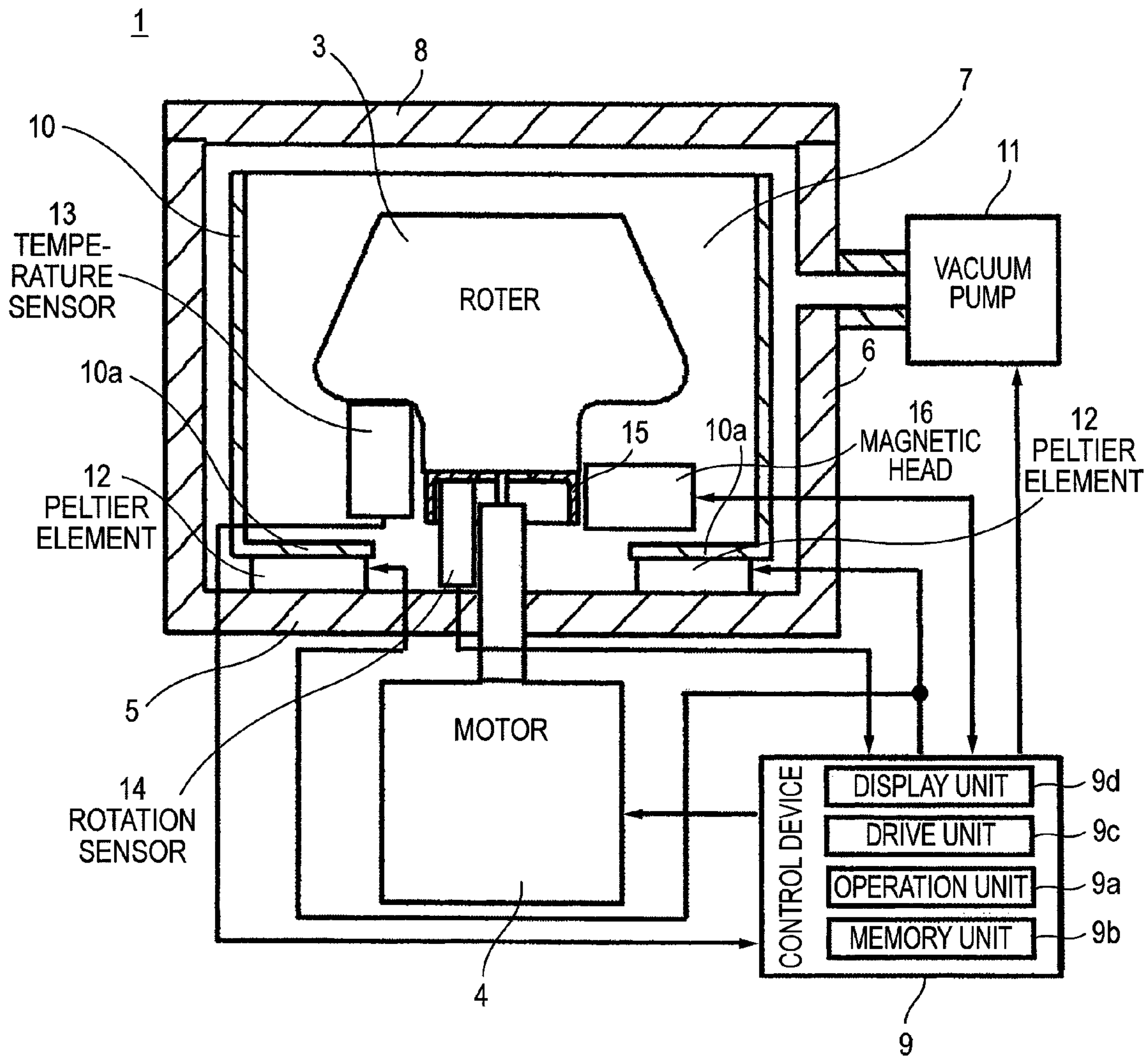
FIG. 2 is a function block diagram of the centrifugal machine shown in FIG. 1.
Figure 3:
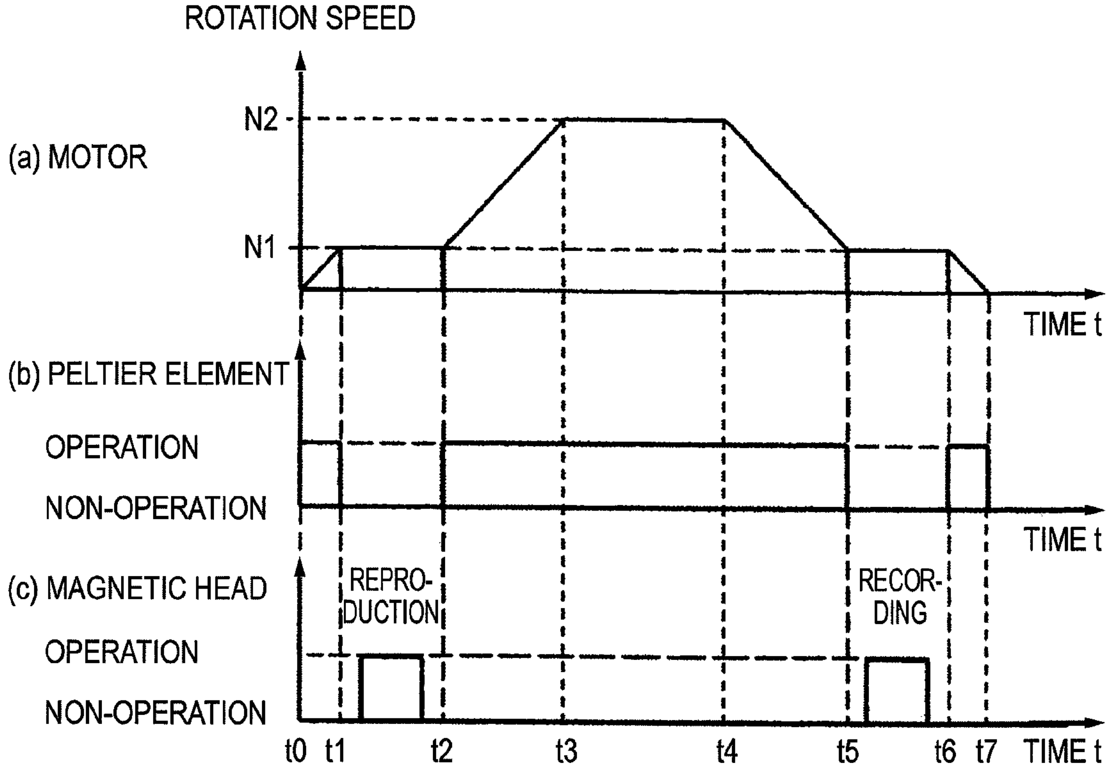
FIG. 3 is a time chart for the operation mode of the centrifugal machine shown in FIG. 1.
Figure 4:
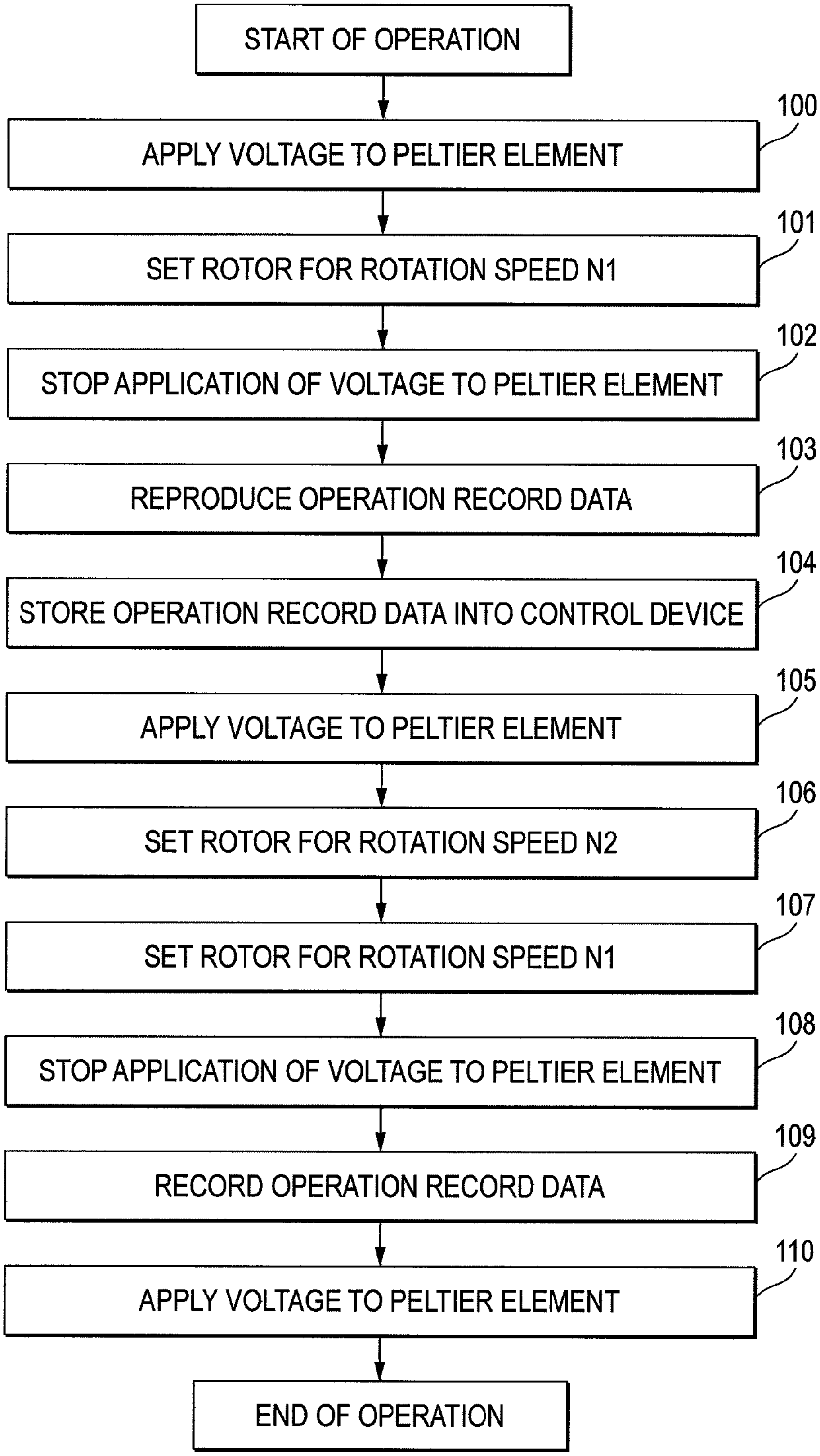
FIG. 4 is a flow chart for a control procedure to be applied to the centrifugal machine shown in FIG. 1.

FIG. 1 is a structure view (a section view) of the whole structure of a centrifugal machine according to the embodiment of the invention. FIG. 2 is a function block of the centrifugal machine shown in FIG. 1. FIG. 3 is a time chart of the operating mode of the centrifugal machine shown in FIG. 1. FIG. 4 is a flow chart used to explain the operation procedure of the centrifugal machine shown in FIG. 1.

Firstly, description will be given of the whole structure of the centrifugal machine with reference to FIG. 1. The centrifugal machine 1 includes a box member (a frame) the shape of the section of which is substantially square when viewed from above. Within the box member 2, there are disposed a rotor 3 which is made of a titanium alloy, an aluminum alloy or the like and is used to hold a specimen vessel (not shown) therein, a motor 4 for applying a rotation drive force to the rotor 3, and a rotor chamber (a rotation chamber) 7 which is defined by a bottom member (a plate) 5 and a partition member 6 and is used to store the rotor 3 therein. Also, on the upper opening portion (an opening/closing portion) of the rotor chamber 7 formed within the box member 2, there is mounted a slide-type door 8 which can be opened and closed with respect to the box member 2. While the rotor 3 is rotating, the door 8 is controlled by a control device (a microcomputer) 9 (which will be discussed later) in such a manner that the door 8 will not open the rotor chamber 7.

The interior of the rotor chamber 7 defined by the bottom member 5 and partition member 6 is decompressed by a vacuum pump 11 which can be actuated during the operation of the rotor 3. This decompression can reduce the heat that is generated by the rotor 3 due to its friction against the air remaining within the rotor chamber 7 while the rotor 3 is rotating.

Within the rotor chamber 7, there is disposed a bowl 10 which is made of, for example, aluminum material, in such a manner that it surrounds the rotor 3. Between the bottom portion 10*a* of the bowl 10 and bottom member (plate) 5, there is held a Peltier element 12 for temperature control. The cold heat of the Peltier element (see FIG. 2) to be controlled by the control device 9 is transmitted immediately to the whole of the rotor chamber 7 through the bowl 10 made of material having high heat conductivity, thereby controlling the temperature of the rotor chamber 7 uniformly to a low temperature, for example, a temperature of 4° C. As a result of this, an increase in the temperature caused by a wind loss during the rotation of the rotor 3 is lowered, and thus an increase in the temperature of the specimen vessel within the rotor 3 involved with the high speed rotation of the rotor 3 in the centrifugal operation is lowered down to a given temperature or lower. The temperature of the rotor chamber 7 is detected by a temperature sensor 13 fixed to the bottom member (plate) 5 and is measured by the control device 9.

As shown in the function block diagram of FIG. 2, the Peltier element 12 and temperature sensor 13 are electrically connected to the control device 9; and, the control device 9 compares the detect value obtained from the temperature sensor 13 with a temperature set value previously set in the control device 9 and, based on the operation result thereof, the control device 9 supplies an on/off controlled drive voltage to the Peltier element 12 in order to cool the Peltier element 12, or stops the supply of the voltage.

The motor 4 is made of an induction motor or the like. A drive source for the motor 4 can be driven by a three-phase ac supply (for example, 300 V, 5 Hz~2.6 kHz), which is obtained by converting a commercial ac supply (for example, 100 V or 200 V, 50/60 Hz) through an inverter, while the drive source allows the high speed rotation of the rotor 3. The rotation speed of the rotor 3 to be driven and rotated by the motor 4 is detected by a rotation sensor 14 which is disposed adjacent to the bottom portion of the rotor 3. As shown in the function block diagram of FIG. 2, the detect value of the rotation sensor 14 is input to the control device 9, while the control device 9 compares and operates the detect value and the set value to thereby control the rotation speed of the motor 4. By the way, the rotation sensor 14 may also be structured such that it detects the rotation speed of the motor 4.

On the bottom portion of the rotor 3, there is disposed a cylindrical-shaped magnetic recording medium (a magnetic memory device) 15. The cylindrical-shaped magnetic recording medium 15 includes, although not shown in the drawings, a magnetic thin film (a magnetic memory film) made of a cylindrical-shaped disk substrate the surface of which is plated, and a coating film (a protection film) formed on top of the magnetic thin film. In the vicinity of the cylindrical-shaped magnetic recording medium 15, there is disposed a magnetic head (a recording head) 16. The cylindrical-shaped magnetic recording medium 15 and magnetic head 16 operate as a kind of hard disk memory. The magnetic recording medium 15 and magnetic head 16, as shown in the block diagram of FIG. 2, are electrically connected to the control device 9. The cylindrical-shaped magnetic thin film of the magnetic recording medium 15 is intermittently magnetized to S and N poles and, when reproducing the operation record data, as will be discussed later, the rotor 3 is rotated at a constant low speed N1 (see FIG. 3) and the magnetic data of the magnetic recording medium 15 are reproduced as voltage waveforms by the magnetic head 16. In this case, the control device 9 reads the wavelengths of the voltage waves between the peaks thereof and converts them to the operation record data. Also, in the operation record data recoding time as well, the rotor 3 is rotated at the constant low speed N1 and the control device 9 applies intermittent voltages to the magnetic head 16 to generate intermittent magnetic fields, whereby the cylindrical-shaped magnetic thin film constituting the magnetic recording medium 15 is intermittently magnetized to S and N poles to record the operation record data therein. Owing to the magnetic recording medium 15, the operation record data such as the number of rotations of the rotor 3 and total operation rotation hours of the rotor 3 can be recorded and reproduced.

The control device 9, as shown in the function block diagram of FIG. 2, includes a microcomputer having an operation portion 9*a* and a memory portion 9*b*, and further includes a drive portion 9*c* which contains a drive circuit for driving the motor 4, a drive circuit for driving the vacuum pump 11 and a drive circuit for driving the Peltier element 12. Further, the control device 9 includes an operation panel which is used to input data expressing the rotation speed of the rotor 3 and operation conditions such as the time necessary for the centrifugal operation, and a display portion 9*d* which is used to display the thus inputted information and monitor the information during the operation of the rotor 3.

The memory portion 9*b* of the control device 9 includes a memory such as a ROM which stores therein data on the control program of the vacuum pump 11, data on the control program of the Peltier element 12 and the like. Also, the memory portion 9*b* further includes a memory such as a RAM or a PROM which is used to reproduce the data on the operation records such as the number of operations and the rotation hours stored in the magnetic recording medium 15 and then record the reproduced data temporarily, and also which is used to temporarily store updated operation record data to be recorded in the magnetic recording member 15.

In the centrifugal machine 1 having the above-mentioned structure, description will be given below of an operation mode according to the invention with reference to a time chart shown in FIG. 3.

When the operation of the motor 4 (rotor 3) is started at a time t0, the Peltier element 12 also starts its operation. In this case, the Peltier element 12 is controlled such that, during the rotation of the rotor 3, the temperature sensor 13 always measures the temperature of the rotor 3 under the control of the control device 9, the measured temperature is compared with the set temperature previously set in the control device 9 by a user, and a voltage (a pulse voltage which is turned on and off at a given cycle) is applied to the Peltier element 12 by the control device 9 to thereby control the temperature of the rotor 3. In this case, when cooling the rotor 3, the bowl 10 is cooled due to absorption of heat from the Peltier element 12 and the rotor 3 is cooled due to radiant heat from the bowl 10.

At a time t1, the control device 9 sets the rotation of the motor 4 (rotor 3) to a given low rotation speed N1. The then rotation speed N1 of the motor 4 is set for a rotation speed, for example, 1,000 $min^{-1}$ (rpm) which is suitable for reproducing the operation record data recorded in the magnetic recording medium 15 through the magnetic head 16, or recording new operation record data, which is temporarily stored in the memory portion 9*b* of the control device 9, into the magnetic recording medium 15 through the magnetic head 16.

While the motor 4 or rotor 3 is rotating at a given low rotation speed N1 during the time t1 to time t2, according to the invention, as shown in FIG. 3B, the operation of the Peltier element 12 is stopped (the Peltier element 12 is held in a non-operation state). During the non-operation period (t1~t2) of the Peltier element 12, as shown in FIG. 3C, the magnetic head 16 is operated to reproduce the operation record data of the magnetic recording medium 15 into the memory portion 9*b* of the control device 9.

The control device 9 accelerates the motor 4 during the period of the time t2~t3 and, in the period of the t3~t4, it sets the rotation speed of the motor 4 (rotor 3) for N2. The thus set rotation speed N2 is to be set for a rotation speed which is set by a user, for example, 100,000 $min^{-1}$ (rpm). During this period, a specimen held by the rotor 3 is centrifuged.

The control device 9, in the period of the time t4~t5, decelerates the motor 4 and, in the period of the time t5~t6, it sets the rotation speed of the motor 4 again for N1 (for example, 1,000 $min^{-1}$). During this period, the control device 9 stops the operation of the Peltier element 12, operates the magnetic head 16, temporarily stores into the memory portion 9*b* not only the operation record data reproduced during the period of the time t1~t2 by the operation portion 9*a* but also the current operation record data, whereby the newest operation record data can be recorded into the magnetic recording medium 15 using the magnetic head 16. This makes it possible that the rotor 3 can always store and hold the newest operation condition data in itself. Here, when the operation record data reach the assumed life of the rotor 3, the control device 9 displays an alarm on the display portion 9*d* or generates a warning sound to thereby stop the rotation of the rotor 3 (motor 4). For the normal operation, at a time t7, the control device 9 stops the motor 4 and ends the centrifugal operation.

Next, description will be given below of a control procedure for controlling the reproduction and recording of the operation record data on the centrifugal machine 1 according to the invention with reference to a flow chart shown in FIG. 4.

In Step 100, when a user previously starts the operation of the centrifugal machine 1, the control device 9 applies a voltage (a pulse voltage) to the Peltier element 12 and starts the temperature control of the rotor 3.

Next, in Step 101, using the motor 4, the rotation speed of the rotor 3 is set for N1 (1,000 $min^{-1}$). Just after then, in Step 102, the control device 9 stops the application of the voltage to the Peltier element 12.

Further, in Step 103, the control device 9 reproduces the operation record data from the magnetic recording medium 15 through the magnetic head 16 and, in Step 104, the thus reproduced data are stored into the memory portion 9*b* of the control device 9.

After then, in Step 105, the control device 9 applies a voltage to the Peltier element 12 again to thereby control the temperature of the rotor 3 to a given temperature. Next, in Step 106, the control device 9 controls the motor 4 in such a manner that the rotor 3 can be set for a preset set rotation speed N2 (for example, 100,000 $min^{-1}$ (rpm). The specimen is centrifuged in this manner.

After the centrifugal operation, in Step 107, the motor 4 is deceleration controlled to thereby set the rotation speed of the rotor 3 for N1 (for example, 1,000 $min^{-1}$) again. Next, in Step 108, the control device 9 stops the application of the voltage to the Peltier element 12.

In the next step 109, the control device 9 adds the operation record at a rotation speed N2 set in the current centrifugal operation to the data stored in the acceleration time of the motor 4, and then stores the thus updated operation record data into the magnetic recording medium 15 through the magnetic head 16.

After the data are recorded, in Step 110, the control device 9 resumes the voltage application to the Peltier element 12. After then, the control device 9 stops the motor 4 and ends the operation of the centrifugal machine 1.

The rotation speed N1 of the rotor 3, which is set when reproducing or recording the operation record data, may not be the illustrated rotation speed 1,000 $min^{-1}$, provided that the range of the centrifugal stress to the rotor 3 is very small, that is, provided that no substantial fatigue limit occurs in the range. When the rotation speed N1 in the reproduction operation or in the recording operation is a rotation speed or a rotation time that must be considered as the operation record data, a correction integer may also be added to the operation record data. Also, the rotation speed N2 of the rotor 3 necessary for centrifugation can also be changed as the need arises.

As can be understood obviously from the above description of the present embodiment, when the operation record data are updated in the magnetic recording medium mounted on the rotor, since the supply of the voltage to the Peltier element for temperature control is turned into an off state (a non-operation state), no noise can be generated from the Peltier element, the operation record data can be reproduced and recorded accurately. Also, because, when recording the operation record data, the same parts as in the prior art can be used, the cost of the centrifugal machine can be reduced.

Although the invention made by the present inventors has been described heretofore based on the embodiment of the invention, the invention is not limited to this embodiment but various changes are also possible without departing from the scope of the subject matter of the invention.

What is claimed is:

1. A centrifugal machine, comprising: a rotor drivable and rotatable by a motor while holding a specimen, and including a recording medium for recording data therein; a Peltier element, when a voltage is applied thereto, for controlling the temperature of the rotor; a recording head disposed at a position adjacent to the rotor for reproducing data from the recording medium or for recording data into the recording medium; and, a control device not only for controlling the operation of the Peltier element when the Peltier element controls the temperature of the rotor but also for controlling the operation of the recording head when the recording head reproduces the data from the recording medium or records the data into the recording medium, wherein the control device, when carrying out the data reproduction or data recording with respect to the recording medium provided in the rotor, controls the Peltier element in such a manner that the operation of the Peltier element is caused to stop.

2. The centrifugal machine according to claim 1, wherein the recording medium is a magnetic memory element and the recording head is a magnetic head.

3. The centrifugal machine according to claim 2, wherein, when the data recorded in the recording medium are reproduced into the memory element of the control device through the recording head, or when the data of the control device are recorded into the recording medium through the recording head, the control device reduces the rotation speed of the rotor or the motor down to a rotation speed which is lower than the rotation speed thereof in the centrifuging operation thereof.

4. The centrifugal machine according to claim 1, wherein, when the data recorded in the recording medium are reproduced into the memory element of the control device through the recording head, or when the data of the control device are recorded into the recording medium through the recording head, the control device reduces the rotation speed of the rotor or the motor down to a rotation speed which is lower than the rotation speed thereof in the centrifuging operation thereof.

* * * * *